J. J. Sherman.
Evaporator.
No. 3,428. Reissued May 11, 1869.
Fig; 1
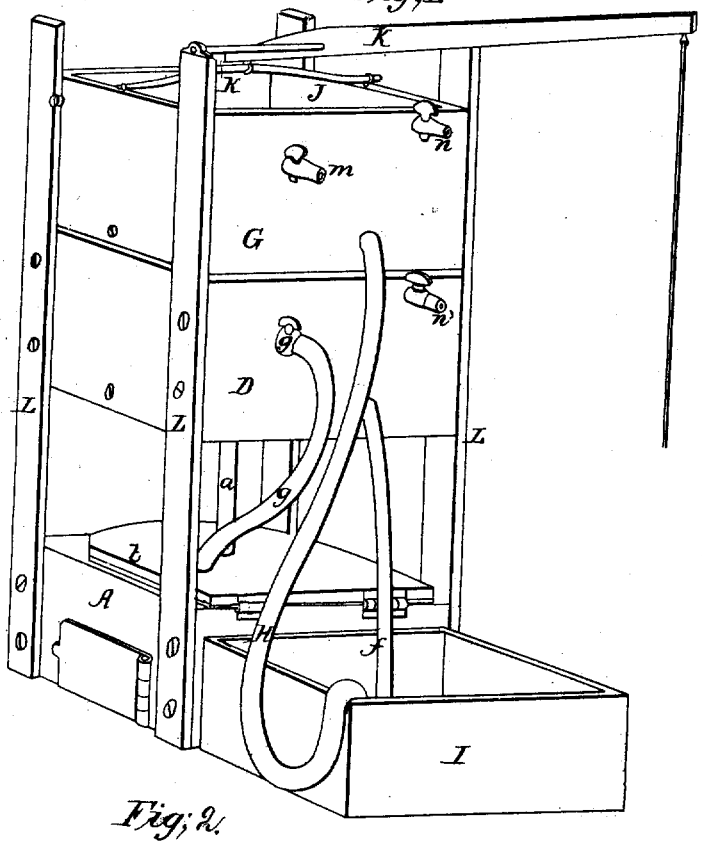
Fig; 2.
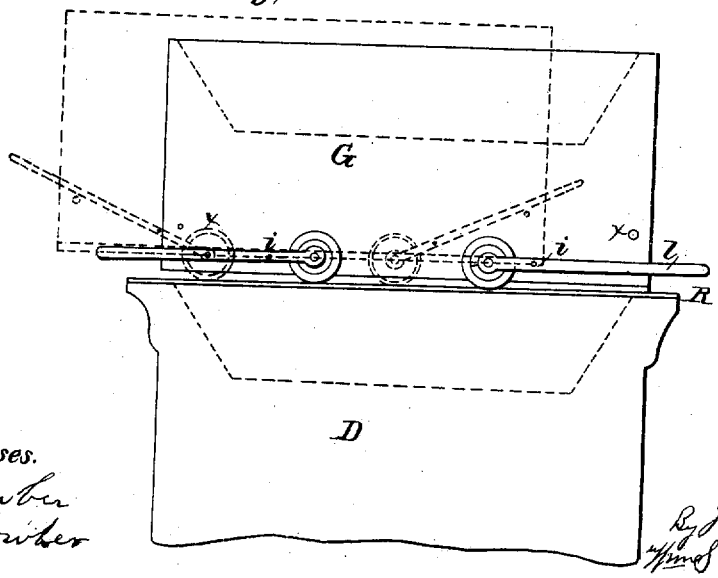
Witnesses.
J. Lowber
E. A. Lowber
Inventor;
By J. J. Sherman
Wm. S. Loughborough
Atty
N. PETERS, PHOTO-LITHOGRAPHER, WASHINGTON, D. C.

UNITED STATES PATENT OFFICE.

JOSIAH J. SHERMAN, OF ALBANY, NEW YORK.

IMPROVED APPARATUS AND PROCESS FOR EVAPORATING LIQUIDS.

Specification forming part of Letters Patent No. 86,948, dated February 16, 1869; Reissue No. 3,428, dated May 11, 1869.

*To all whom it may concern:*

Be it known that I, JOSIAH J. SHERMAN, of the city of Albany, in the county of Albany and State of New York, have invented a new and Improved Process and Apparatus for Evaporating Liquids; and I do hereby declare that the following is a full, clear, and exact description thereof, reference being had to the drawings accompanying this specification, and making part of the same, in which—

Figure 1 is a perspective view of one form of my apparatus for conducting the improved process. Fig. 2 is a side elevation of the steam-chests D and G, showing a plan of removing one from over another horizontally, either laterally or otherwise.

The nature and object of my invention will be better understood by reference to the specification and drawings.

In the furnace A, Fig. 1, I set, in a suitable manner, any desirable form of evaporating-pan, over which I place a cover, C, hinged or otherwise attached so as to be wholly or partially removable. The evaporating-pan is made steam-tight by the application between it and the cover of a packing, *b*, of any suitable material. Above this primary evaporating-pan, and supported by the frame-work L L, I provide a steam-chest, D, constructed of any suitable non-conducting material, and having set within it a supplementary evaporating-vessel, in such a manner as to form a steam-tight chamber between its bottom and the bottom of the chest D. An induction-cock, *n'*, is provided near the top of one side of this evaporating-vessel, to introduce the liquid to be evaporated, and near the bottom an eduction-cock, *g'*, is also provided, to withdraw the partially-concentrated contents, if desired. The steam-chest D communicates with the steam-space of the lower or primary vessel by means of the pipe *a*, which enters through the cover C, and may be made of a flexible material to allow said cover to be raised. The steam which rises in the primary evaporating-vessel will thus communicate more or less of its heat to the supplementary vessel, which is utilized for further evaporation therein.

For the purpose of further utilizing the heat generated in the primary evaporating-vessel, I may use on top, or in any convenient position away from the steam-chest D, another chest, G, arranged also with a supplementary evaporating-vessel and stop-cocks similarly to D, and receiving in turn, through a pipe or otherwise, the vapor generated in the vessel below it. The bottom of the chest G serves as a cover for the antecedent evaporating-vessel, and is fitted, as nearly as may be, steam-tight to it, so as to serve as a substitute for the cover C.

A pipe, *g*, may be attached to the stop-cock *g'* of the first supplemental vessel, and the concentrated liquid drawn down into the primary vessel for purposes of further evaporation, or conducted to any place desired. A similar connection may be made between the second and first supplemental vessels; or any other desirable plan of removing the liquids may be adopted.

The tank I receives the water of condensation from the steam-chests D and G through the pipes *f* and H, and it is plain that the pressure of steam in the chests, and the consequent degree of heat, will be in proportion to the depth to which the pipes *f* and H are immersed in the water in the tank, or otherwise made to afford a resistance to the free escape of either the steam or the water of condensation accumulating in the steam-chambers.

In the use of my apparatus, especially for the manufacture of salt, it is necessary to provide for the frequent removal of the covers of the evaporating-vessels for the purpose of cleaning, repairs, or removal of salt incrustations and deposits.

In the case of the apparatus herein described, I may remove the chest G vertically from its working position by means of the lever K, having its fulcrum at *k*, and connected to the chests by a link and bail, or other device, a rope, either simply or with block and tackle, being attached to the outer end of the lever for greater convenience.

Another, and in some cases preferable, method is shown in Fig. 2, where I use four wheeled levers, *l l*, two on each side of the chest G or the chest D, or others when used or adjusted like G, the wheels running on the horizontal track R, provided, in the present instance, on the upper side of the chest D. These levers vibrate on centers *i i*, and, when lifted to the position shown by the red lines, raise the superincumbent chest perpendicularly a short distance, so that the packing *b* may not be broken or otherwise injured, when the said chest may be rolled to one side, or longitudinally, if desired, as indicated by the red lines, the levers being supported by the pins *x x*. The levers may be applied in any desirable manner, so as to accomplish the effect described, or their mechanical equivalent may be substituted.

The track R may be extended to any required length, so that access may be had to the whole or a part of the antecedent vessel or vessels.

It is obvious that the steam-chest D may be adjusted immediately upon the primary vessel, or that the cover C may be used on any of the supplemental vessels. It is not necessary that the supplemental vessels be situated directly over the primary vessels, as they may be placed obliquely either above, below, or in any direction away from, or even under it or each other, as the case may be, and connected by suitable pipes, or by a covering or an edgewise intercommunication, properly shedded, to prevent the return of the water of condensation.

What I here claim as my invention, and desire to secure by Letters Patent, is—

1. The evaporating apparatus, whether embracing one or more supplemental steam-chests, substantially as described, when placed directly upon or over a primary or other antecedent vessel or vessels containing a liquid subjected to heat, in combination with any suitable mechanical device for either raising it vertically or removing it horizontally, or both, from such primary or other vessel or vessels, or their surroundings, for any purpose whatever.

2. The supplemental evaporating apparatus, substantially as described, whether consisting of but one or more chests or vessels, when supported immediately over or upon, or at any distance, either wholly or partially over or under or diagonally from a primary or other antecedent vessel or vessels containing a liquid subjected to heat, in combination with a cover or covers, either opening or removable, or both, to such primary or other vessel or vessels, with a connection or connections between such primary or other vessel or vessels and such apparatus, so as to afford open access to the whole or any part of such primary or antecedent vessel or vessels, or their surroundings, for any purpose whatever.

JOSIAH J. SHERMAN.

Witnesses:
CHARLES M. JENKINS,
WILLIAM LANSING.